Figure 1:
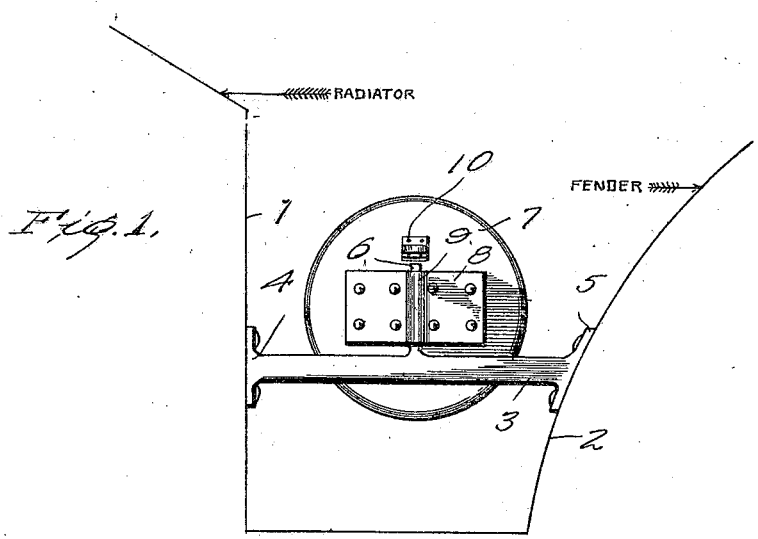

June 10, 1924.

J. F. LOVELL 1,497,338

DIRIGIBLE HEADLIGHT

Filed Jan. 4, 1923

Inventor
J. F. Lovell

Witness

By Richard B. Owen,
Attorney

Patented June 10, 1924.

1,497,338

UNITED STATES PATENT OFFICE.

JOSEPH F. LOVELL, OF SAN FRANCISCO, CALIFORNIA.

DIRIGIBLE HEADLIGHT.

Application filed January 4, 1923. Serial No. 610,638.

*To all whom it may concern:*

Be it known that I, JOSEPH F. LOVELL, a citizen of the United States, residing at San Francisco, in the county of San Francisco and State of California, have invented certain new and useful Improvements in a Dirigible Headlight, of which the following is a specification.

The present invention relates to a dirigible headlight for automobiles and the like and has for its principal object to provide means for mounting a headlight so that the same may be automatically turned so as to throw the light in the direction in which the vehicle is moving so that the road may be plainly seen by the operator of the vehicle.

Another important object of the invention is to thoroughly improve upon devices of this nature by providing a simple and efficient structure, one which is reliable in operation, durable, inexpensive to manufacture, attractive in appearance, and well adapted to the purpose for which it is designed.

With the above and numerous other objects in view as will appear as the description progresses, the invention resides in certain novel features of construction, and the combination and arrangement of parts as will be hereinafter more fully described and claimed.

Figure 2:
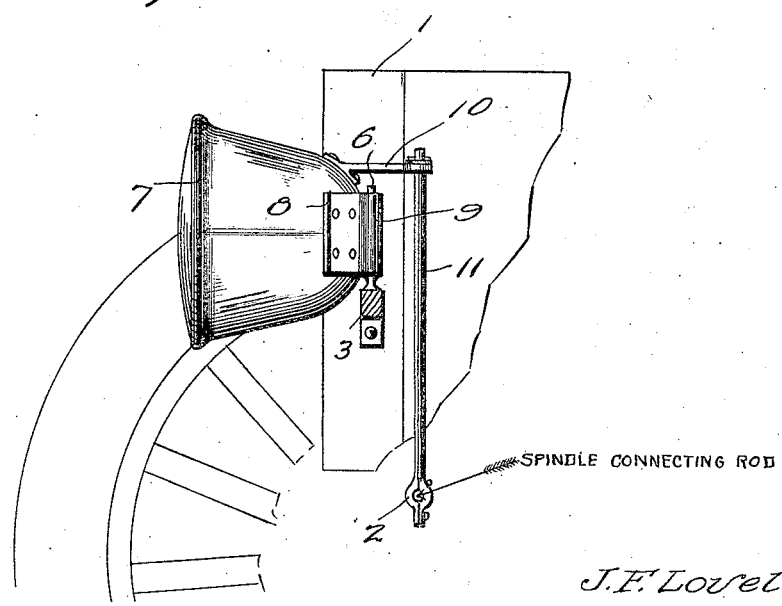

In the drawing:

Figure 1 is a rear elevation of the headlight embodying my invention showing the support therefor, and Figure 2 is a side elevation thereof.

Referring to the drawing in detail it will be seen that the vehicle shown is an automobile and includes among other elements the radiator 1, the front fender 2, and the spindle connecting rod. My invention is associated with these conventional parts of an automobile and consists of the supporting bar 3 which extends horizontally and terminates in the feet 4 and 5 the latter of which is preferably arcuate and is attached to the fender by rivets or bolts while the other foot 4 is attached to the radiator in a similar manner. An upright stud 6 is positioned intermediately of the bar 3 for revolvably receiving the headlight 7. On this headlight 7 a plate 8 is fixed to the rear thereof and is curved intermediate its ends to form a sleeve 9 for receiving the stud 6. An arm 10 is also fixed to the rear of the headlight and is provided with an apertured terminal. A rod 11 projects through the apertured terminal and is vertically disposed and terminates at its bottom end in a clamp 12 of any suitable construction for engagement with the spindle connecting rod so that as the vehicle is steered to the right or left the headlight will be turned in a like direction so as to always throw its rays of light immediately ahead of the vehicle.

Although I have described my invention with a certain degree of particularity it is to be understood that numerous changes in the details of construction and in the combination and arrangement of parts may be resorted to without departing from the spirit of the invention as hereinafter claimed.

Having thus described my invention what is claimed as new is:—

In combination, an automobile including a radiator, a fender, a spindle connecting rod, a bar disposed between the radiator and fender, a headlight, a plate on the headlight having its intermedite portion curved to form a sleeve, a stud intermediately disposed vertically on the bar and received in the sleeve, an arm extending from the headlight and provided with an apertured terminal, a rod passing through the apertured terminal and provided with a clamp at its bottom end for engagement with the spindle connecting rod.

In testimony whereof I affix my signature in presence of two witnesses.

JOSEPH F. LOVELL.

Witnesses:
M. G. STIRLING,
A. J. KNOX.